United States Patent [19]
Bickers

[11] Patent Number: 4,761,797
[45] Date of Patent: Aug. 2, 1988

[54] FLEXIBLE REGENERATOR

[75] Inventor: Lawrence Bickers, Ipswich, England

[73] Assignee: British Telecommunications, plc, London, England

[21] Appl. No.: 802,181

[22] Filed: Nov. 25, 1985

[30] Foreign Application Priority Data

Nov. 27, 1984 [GB] United Kingdom ................. 8429921

[51] Int. Cl.$^4$ ........................ H04B 3/06; H04L 25/66
[52] U.S. Cl. ........................................ 375/4; 375/113; 328/164; 178/63 E
[58] Field of Search ....................... 375/3, 4, 106, 113, 375/110, 111; 178/70 R, 70 E, 70 S, 70 T; 328/164; 331/149, 10; 333/193; 340/814; 358/140, 148, 158; 455/601, 608

[56] References Cited

U.S. PATENT DOCUMENTS

| | | | |
|---|---|---|---|
| 370,576 | 9/1887 | Rysselberghe | 178/70 E |
| 3,085,200 | 4/1963 | Goodall | 375/4 |
| 3,183,442 | 5/1965 | Filipowsky | 375/4 |
| 3,371,225 | 2/1968 | Featherston | 307/233 |
| 3,924,194 | 12/1975 | Cook | 328/164 |
| 3,962,635 | 6/1976 | Roza | 375/4 |
| 4,320,515 | 3/1982 | Burton, Jr. | 328/164 |
| 4,339,824 | 7/1982 | Tanimoto | 328/164 |
| 4,490,698 | 12/1984 | Morimoto | 333/193 |
| 4,532,555 | 7/1985 | Sagara et al. | 358/148 |
| 4,651,209 | 3/1987 | Okada et al. | 358/148 |

OTHER PUBLICATIONS

IEEE Transactions on Sonics and Ultrasonics, vol. 30, No. 3, May 1983, pp. 120-126.
Journal of Lightwave Technology, vol. LT-2, No. 3, Jun. 1984 pp. 243-267.
Optical Fiber Repeatered Transmission Systems Utilizing SAW Filters, IEEE Transactions on Sonics and Ultrasonics, vol. 30 No. 3, May 1983, pp. 120-126.
Receiver Design for High Speed Optical-Fiber Systems Journal of Lightwave technology, vol. LT-2, No. 3, Jun. 1984 pp. 243-267.

*Primary Examiner*—Benedict V. Safourek
*Attorney, Agent, or Firm*—Nixon & Vanderhye

[57] ABSTRACT

A regenerator 10 is provided with a tuning recovery facility 15 which has a multiple passband capability. The regenerator can operate with several line bit rates each corresponding to one of the passbands.

8 Claims, 3 Drawing Sheets

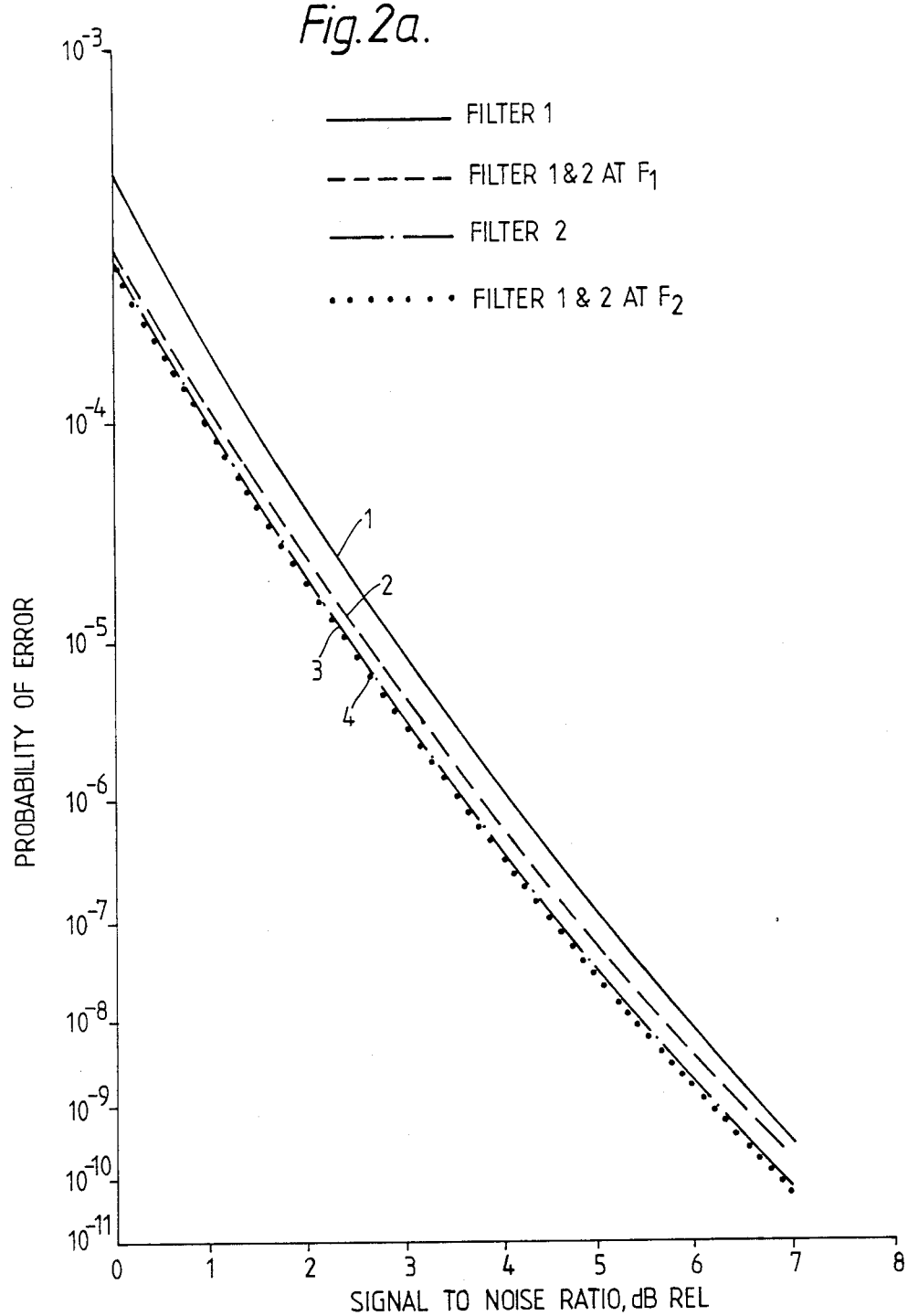

FLEXIBLE REGENERATOR

FIELD OF THE INVENTION

This invention relates to regenerators or repeaters. In particular the invention relates to regenerators which are used in digital transmission systems.

BACKGROUND OF THE INVENTION

A digital transmission link, such as a submarine cable, attenuates data signals which are transmitted along it. Regenerators are devices which are located at appropriate points along the link to reform the digital signals in order to overcome the effects of attenuation. In a digital link each regenerator usually has a clock recovery circuit which generates clock signals from the incoming data signals to provide the necessary timing signals for the various circuits of the regenerator. The clock recovery circuit can include a timing recovery filter or phase locked loop.

It is conventional for each regenerator to have a single timing recovery rate which corresponds to the line rate of the transmission system. This line rate is fixed by the frequency passband characteristics of the timing recovery filter or phase locked loop and cannot be changed once the system is operational.

In some applications there is a need for the transmission systems to transmit at more than one rate. This has been achieved using untimed regenerators but this is not entirely satisfactory.

SUMMARY OF THE INVENTION

The present invention is concerned with a regenerator which includes a timing recovery facility which is operable at a plurality of frequencies.

According to the present invention there is provided a regenerator for a digital transmission system, said regenerator including timing recovery means provided with passband filtering means capable of operating at more than one frequency passband.

The regenerator may have a plurality of passband filters connected in parallel. Each filter may be a surface acoustic wave (SAW) device.

A regenerator of the present invention can operate with a line bit rate corresponding to any one of the filter passbands thereby enabling the transmission system to operate selectively at any one of these bit rates.

BRIEF DESCRIPTION OF THE DRAWINGS

The invention will be described now by way of example only with particular reference to the accompanying drawings. In the drawings:

FIGS. 2a and 2b are curves illustrating the performance of regenerators in accordance with the present invention.

DETAILED DESCRIPTION

Figure 1:
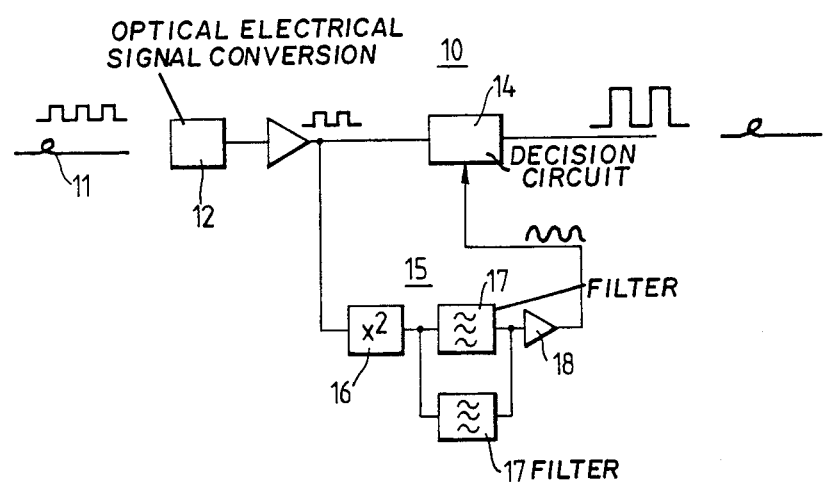
FIG. 1 is a schemmatic diagram showing a regenerator in accordance with the present invention.

Referring to FIG. 1 a regenerator 10 is shown connected in an optical transmission link 11. Digital optical signals transmitted along the link 11 are converted to electrical pulses by a circuit 12. The electrical pulses are fed to a decision circuit 14 and also to a timing recovery circuit 15. The recovery circuit 15 includes a squaring circuit 16 which generates narrow peaks at intervals corresponding to the required clock rate, a plurality of filters 17 which are connected in parallel and an amplifier 18. The amplifier output is fed to the decision circuit 14. Each filter 17 can be an SAW device. Each filter has a different frequency passband, the frequency passband of a particular filter corresponding to one of the bit rates to be used on the transmission link.

In operation the squaring circuit of the timing recovery circuit operates to produce spikes at the required clock rate. These are filtered by one of the filters 17 according to the bit rate being used to produce clock signals which are applied to the decision circuit so that it regenerates data pulses at the correct instant.

The present invention can be used in transmission systems designed to operate at several bit rates provided the timing recovery circuit has sufficient filters to provide a frequency passband corresponding to each of the bit rates.

A regenerator in accordance with the present invention has been tested with a number of filters. These are as follows

| FILTER NUMBER | PASSBAND FREQUENCY MHz | 3 dB BANDWIDTH kHz | FILTER TYPE |
|---|---|---|---|
| 1 | 314.35 | 146 | Resonator |
| 2 | 512.12 | 500 | Resonator Filter |
| 3 | 344.00 | 930 | Transversal |

Figure 2B:
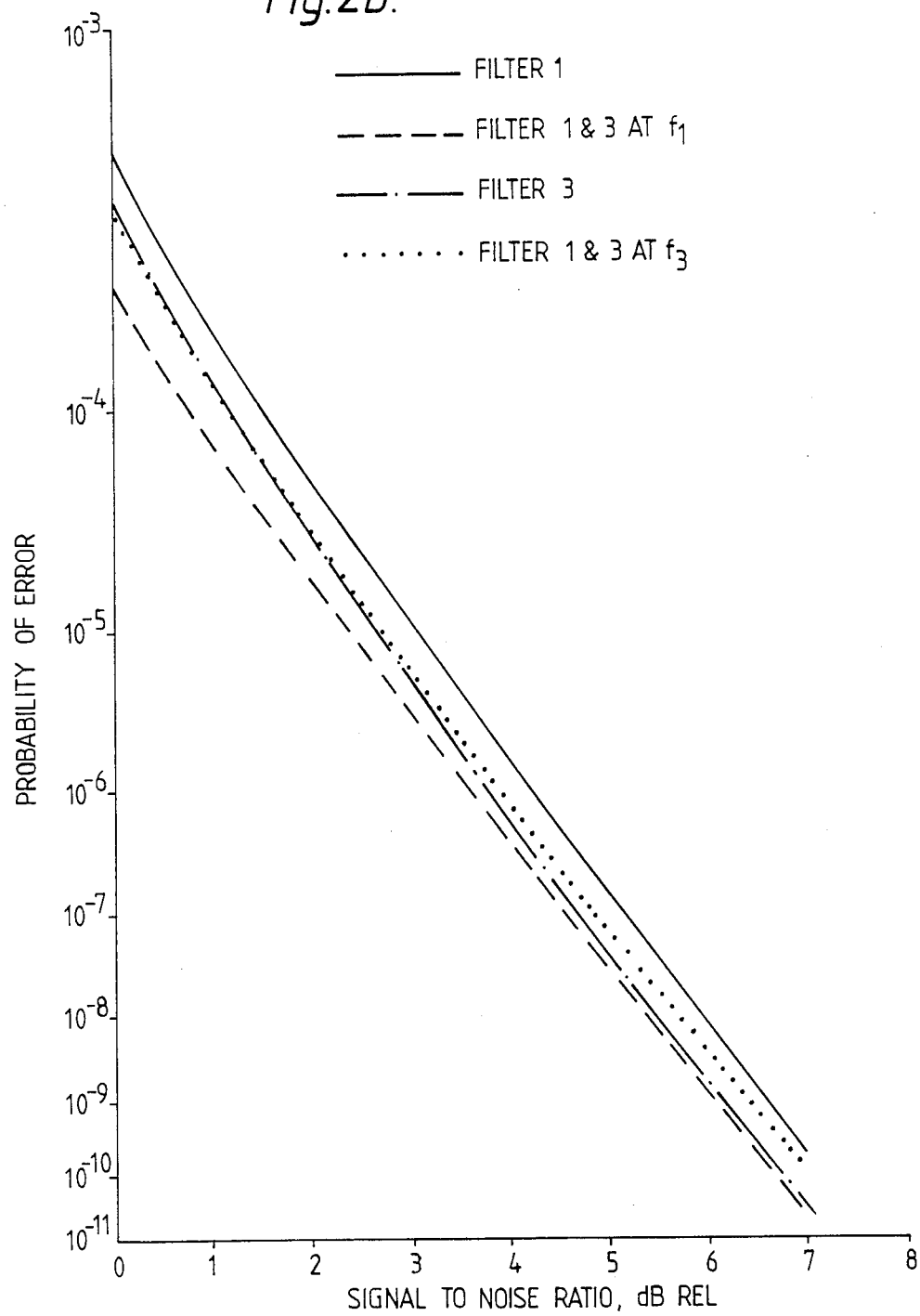

In the tests line bit rates corresponding to the passband frequencies of the filter were applied to the regenerator. Noise signals were mixed with the test signals. Bit error rate measurements were performed using single and dual passbands and in each case 100% raised cosine equalization was performed at the highest passband frequency. The results are shown in FIG. 2a for the filters 1 and 2 (narrowband to narrowband) of the above table and FIG. 2b for filters 1 and 3 (narrowband-wideband). In FIG. 2a curve 1 shows the result for a regenerator provided with filter 1 only, curve 2 for a regenerator provided with filters 1 and 2 and operating at a bit rate corresponding to the passband of filter 1, curve 3 for a regenerator provided with filter 2 only, and curve 4 for regenerator provided with filters 1 and 2 and operating at a bit rate corresponding to the passband of filter 2. FIG. 2b has corresponding curves for filters 1 and 3. The results show no significant degradation due to dual timing recovery filter passbands and in fact the probability of error is reduced when a plurality of filters is used.

Although the arrangement described above has a plurality of filters connected in parallel the same result can be achieved with a single filter which has a multiple passband capability.

I claim:

1. A digital signal regenerator adapted to regenerate digital signals at a plurality of substantially distinct bit rates, said regenerator comprising:
    regeneration means operable at any of said bit rates to produce a regenerated digital signal from an input digital signal; and
    timing recovery means operable at said bit rates for controlling the regeneration means, said timing recovery means comprising:
    means coupled to receive the input digital signal and responsive to the input digital signal bit rate for generating a timing signal corresponding to the bit rate of the input digital signal;

filter means for filtering the timing signal, said filter means being adapted to pass a timing signal corresponding to each one of said plurality of bit rates; and means for applying the filtered timing signal to the regeneration means, thereby to time the regenerated digital signal in correspondence with the bit rate of the input digital signal, wherein the filter means comprises a plurality of passband filters connected in parallel, each one of said filters having a passband corresponding to one of said bit rates.

2. A regenerator according to claim 1, wherein the filter means comprises a surface acoustic wave (SAW) device.

3. A digital signal regenerator adapted to regenerate digital signals at a plurality of substantially distinct bit rates, said regenerator comprising:

regeneration means operable at any of said bit rates to produce a regenerated digital signal from an input digital signal; and timing recovery means operable at said bit rates for controlling the regeneration means, said timing recovery means comprising:

means coupled to receive the input digital signal and responsive to the input digital signal bit rate for generating a timing signal corresponding to the bit rate of the input digital signal;

filter means for filtering the timing signal, said filter means being adapted to pass a timing signal corresponding to each one of said plurality of bit rates; and means for applying the filtered timing signal to the regeneration means, thereby to time the regenerated digital signal in correspondence with the bit rate of the input digital signal, wherein the filter means comprises at least one multiple passband filter adapted to pass timing signals corresponding to more than one of said bit rates.

4. A regenerator according to claim 3, wherein the filter means comprises a surface acoustic wave (SAW) device.

5. In a digital signal transmission system for transmitting digital signals at a plurality of substantially distinct bit rates including digital signal regeneration means operable to regenerate a received input digital signal, a method for regenerating input digital signals which are received by a single regeneration means at any of a plurality of substantially distinct bit rates comprising the steps of:

(a) generating, in response to the input digital signal, a timing signal corresponding to the bit rate of the input digital signal;

(b) filtering the timing signal so as to pass a timing signal corresponding to each one of the plurality of distinct bit rates; and (c) applying the filtered timing signal to the regeneration means to thereby time the regenerated digital signal in correspondence with the bit rate of the input digital signal, wherein the step of filtering the timing signal includes the step of applying the timing signal to a plurality of passband filters wherein each filter has a passband corresponding to one of said bit rates.

6. A method according to claim 5, wherein the step of applying the timing signal to a plurality of passband filters comprises the step of applying the timing signal to a plurality surface acoustic wave (SAW) devices.

7. In a digital signal transmission system for transmitting digital signals at a plurality of substantially distinct bit rates including digital signal regeneration means operable to regenerate a received input digital signal, a method for regenerating input digital signals which are received by a single regeneration means at any of a plurality of substantially distinct bit rates comprising the steps of:

(a) generating, in response to the input digital signal, a timing signal corresponding to the bit rate of the input digital signal;

(b) filtering the timing signal so as to pass a timing signal corresponding to each one of the plurality of distinct bit rates; and (c) applying the filtered timing signal to the regeneration means to thereby time the regenerated digital signal in correspondence with the bit rate of the input digital signal, wherein the step of filtering the timing signal includes the step of applying the timing signal to at least one multiple passband filter which is adapted to pass timing signals corresponding to more than one of said bit rates.

8. A method according to claim 7, wherein the step of applying the timing signal to at least one multiple passband filter includes the step of applying the timing signal to at least one surface acoustic wave (SAW) device.

* * * * *